United States Patent
Shadow et al.

(10) Patent No.: US 6,804,567 B2
(45) Date of Patent: Oct. 12, 2004

(54) COMPUTERIZED VOC AND SOLVENT USAGE WARNING SYSTEM

(75) Inventors: Gregory S. Shadow, Brighton, MI (US); Melissa S. Kerkau, Birchrun, MI (US); Aimee R. Datsko, Clinton Township, MI (US); Paul E. Lamberty, Romeo, MI (US)

(73) Assignee: BASF Corporation, Southfield, MI (US)

( * ) Notice: Subject to any disclaimer, the term of this patent is extended or adjusted under 35 U.S.C. 154(b) by 229 days.

(21) Appl. No.: 09/938,396

(22) Filed: Aug. 23, 2001

(65) Prior Publication Data

US 2002/0077716 A1 Jun. 20, 2002

Related U.S. Application Data

(63) Continuation-in-part of application No. 09/471,713, filed on Dec. 23, 1999, now Pat. No. 6,330,487, which is a continuation-in-part of application No. 08/966,960, filed on Nov. 10, 1997, now Pat. No. 6,073,055.

(51) Int. Cl.$^7$ .............................................. G06F 19/00
(52) U.S. Cl. ......................................... 700/97; 700/95
(58) Field of Search ............................ 700/95, 96, 97, 700/117; 401/29, 44

(56) References Cited

U.S. PATENT DOCUMENTS

| | | | |
|---|---|---|---|
| 5,548,528 A | * 8/1996 | Keeler et al. | 702/22 |
| 5,664,112 A | * 9/1997 | Sturgeon et al. | 705/28 |
| 5,689,415 A | 11/1997 | Calotychos et al. | 364/172 |
| 5,718,061 A | 2/1998 | Scheufler et al. | 34/475 |
| 5,832,411 A | 11/1998 | Schatzmann et al. | 703/23 |
| 5,970,426 A | * 10/1999 | Mandel et al. | 702/32 |
| 6,064,919 A | * 5/2000 | Slusarczyk | 700/117 |
| 6,073,055 A | * 6/2000 | Jahn et al. | 700/97 |
| 6,330,487 B1 | * 12/2001 | Jahn et al. | 700/97 |
| 6,564,154 B1 | * 5/2003 | Zimmerman et al. | 702/24 |
| 6,611,735 B1 | * 8/2003 | Henly et al. | 700/266 |

FOREIGN PATENT DOCUMENTS

| | | | |
|---|---|---|---|
| EP | 915 401 | 11/1998 | G05B/19/042 |

* cited by examiner

*Primary Examiner*—Anthony Knight
*Assistant Examiner*—Ronald D Hartman, Jr.

(57) ABSTRACT

A computer-implemented apparatus is provided for coordinating paint-related process steps at a paint-application facility. The paint-related process steps include at least one of: data collecting, calculating, evaluating and reporting volatile organic content of paint and actual and projected paint and solvent usage from a painting process and solvent and volatile organic emission regulation data.

19 Claims, 9 Drawing Sheets

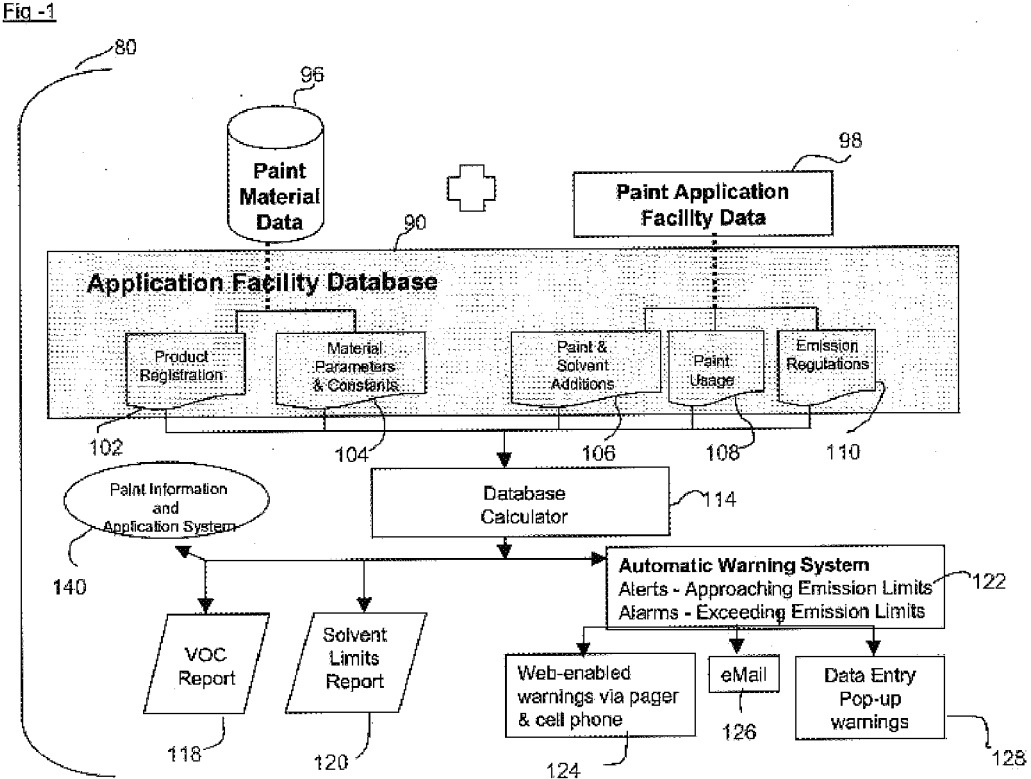

Fig -1A

VOC calculations based on Solvent Density & warnings based on daily & monthly limits

Fig - 1B

| Indicator | Product Name | WA Code | Customer Material kg | Batch # | Start Level | Paint Adds | End Level | Paint Usage | Scrap | Paint Pulls | Batch %NV | Batch VOC | Prev VOC | Solvent A g/cm³ aroma | Solvent B g/cm³ g/cm³ | Solvent C g/cm³ g/cm³ |
|---|---|---|---|---|---|---|---|---|---|---|---|---|---|---|---|---|
| BS | Black | M6524 | M6524 | 301 | 700.00 | 80.00 | 950.00 | -170.00 | | 20.00 | 60.00 | 3.90 | 3.80 | 20.00 | | 25.00 |
| BM | Red Metallic | M6758 | M6758 | 200 | 700.00 | -20.00 | 950.00 | -270.00 | 20.00 | | 60.00 | 3.80 | 3.90 | | 30.00 | |
| BM | Red Metallic | M6758 | M6758 | 201 | | 50.00 | | 50.00 | | | 67.00 | 3.70 | 3.80 | | | |
| BM | Silver Metallic | M6720 | M6720 | 100 | 1,050.00 | | 950.00 | 100.00 | | | 54.00 | 4.02 | 4.10 | | | |
| BM | Silver Metallic | M6720 | M6720 | 101 | | 50.00 | | 60.00 | 20.00 | | 48.00 | 3.90 | 4.00 | 20.00 | | |

Fig - 1C

| Date | Product No | Name | Amt Used | Daily Limit | Daily Alarm | Cumulative Amt Used | Monthly Limit | Monthly Alarm | Unit |
|---|---|---|---|---|---|---|---|---|---|
| 07/02/2001 | SA0160 | Solvent A | 40.00 | 20.00 | X | 40.00 | 300.00 | | gal (US) |
| 07/02/2001 | SA0200 | Solvent B | 20.00 | 30.00 | | 20.00 | 300.00 | | gal (US) |
| 07/02/2001 | SA0300 | Solvent C | 15.00 | 30.00 | | 15.00 | 300.00 | | gal (US) |
| 07/23/2001 | SA0200 | Solvent B | 10.00 | 30.00 | | 30.00 | 300.00 | | gal (US) |
| 07/23/2001 | SA0300 | Solvent C | 10.00 | 30.00 | | 25.00 | 300.00 | | gal (US) |

Alerts
If plant enters too much solvent and approaches the daily or monthly limit, alerts are generated to warn about excessive emissions

Alarms

If plant enters too much solvent and exceeds the daily or monthly limit, Alarms are generated to warn about excessive emissions

COMPUTERIZED VOC AND SOLVENT USAGE WARNING SYSTEM

RELATED APPLICATIONS

This application is a continuation in part application Ser. No. 09/471,713, filed Dec. 23, 1999, and issued as U.S. Pat. No. 6,330,487, which is a continuation in part of U.S. Ser. No. 08/966,960, filed Nov. 10, 1997 and issued as U.S. Pat. No. 6,073,055.

BACKGROUND OF THE INVENTION

1. Field of the Invention

The present invention relates generally to warning systems and more particularly to warning systems utilized in paint manufacturing and paint application.

2. Description

Operations within paint application facilities contain many devices and process controllers that chiefly work independently to achieve their individual goals. Moreover, data is individually obtained from them without a structured framework to synthesize the data to provide feedback to the assembly plant. Information from paint application facilities is not only difficult to synthesize for an overall systems perspective, but the information is not part of an integrated data system. Lacking are the tools needed by the sites to provide feedback when chemistries are not in tolerance with such predefined standards as EPA regulations. Accordingly, there is a need to overcome these and other disadvantages exhibited by previous approaches to operating paint-related facilities.

SUMMARY OF THE INVENTION

In accordance with the teachings of the present invention, a computer-implemented apparatus and method are provided for coordinating paint-related acquired data with a warning system for a paint manufacturing or paint application facility, preferably a vehicle manufacturing facility. A process control data structure comprises a paint application database for storing paint-related data. The database information includes paint-related data from paint materials, from the paint application process and from emission regulation requirements and stores it in a database. The process control data structure additionally comprises a calculation means interrelated to the database for performing calculations related to manufacturing facility emissions and regulatory requirements for said emissions data in said database. The data provided from these calculations interrelates to a data display for receiving and viewing the interrelated paint process data at the paint application facility or at a remote location. The process control data structure further comprises a software activated warning device connected to at least one of the calculator, the data display or the database.

BRIEF DESCRIPTION OF THE DRAWINGS

Additional advantages and features of the present invention will become apparent from the subsequent description in the appended claims, taken in conjunction with the accompanying drawings in which:

FIG. 1 is an overview of the computer implemented apparatus for coordinating the paint related process steps.

FIG. 1A is a sample input to the material constants component of the paint process control data;

FIG. 1B is a monthly report of volatile organic content emissions of a paint application facility generated by the computer implemented apparatus.

FIG. 1C is a monthly report of solvent limits for the paint application facility generated by the computer implemented apparatus.

DESCRIPTION OF THE INVENTION

Figure 2:
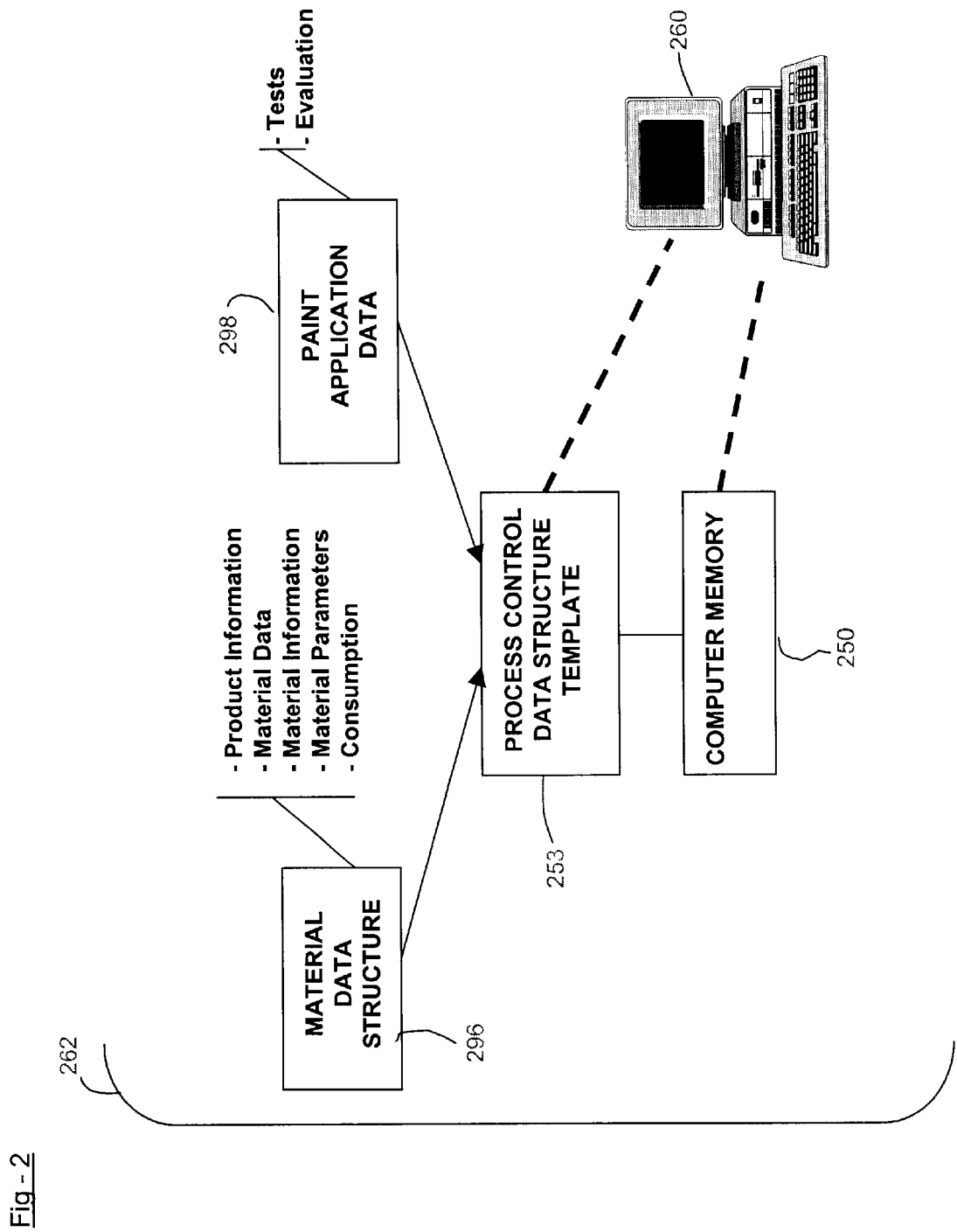
FIG. 2 depicts the process control data structure template contained in the computer memory.

The present invention comprises a computer-implemented apparatus for coordinating paint related process steps of a paint-related facility where the apparatus comprises a process control data structure having at least one application facility database for acquiring paint characteristic data from at least one data source. The paint-related facility may be any paint manufacturing facility or paint application facility. Examples of paint application facilities include vehicle assembly plants where vehicles are painted or coil or extrusion coating operations or bodyshops where vehicles are painted outside assembly plant conditions. The preferred embodiment of the present invention relates to vehicle assembly plants. However, the present invention is useful in any facility where paint is applied to a substrate.

The data collected by the process control data structure database includes paint-related characteristics, including material constants and material parameters of paint. Paint material constants include density, volatile organic content (voc), and percent non-volatile content, among others. Paint material parameters include information such as solvent content, viscosity, and paint composition, among others. Additional data collected by the database includes paint and solvent usage or volatile organic content emissions together with emissions regulation data. In the case of solvent-borne paint, volatile organic content (voc) emissions are the amount of volatilized solvent. In the case of water-borne paint, voc emissions are the amount of volatilized organics less water.

A calculation means is attached to said database where paint characteristics and emissions regulation data are stored. A data display such as a computer is connected to said database and to said calculation means for generating reports related to volatile organic content emissions and for providing a pop-up warning where said emissions may exceed preset limits.

An electronic warning means to convey a warning message is connected to said database and said calculation device, and said electronic warning means is automatically activated by the software when volatile organic emissions are outside a specified range or exceed a predetermined limit. The electronic warning means may comprise any electronic device that interfaces with the database. The electronic device will transmit a warning at the paint application facility or to a remote destination. The electronic warning device may comprise a computer and may be the same as or different from the data display, and may be electronic mail or other internet based communication means, cellular phone, pager, etc.

Additionally, the information and the reports generated by the apparatus may be communicated to a remote location and the computer implemented apparatus or only the database may interface with another computer based structured framework for integrating information to provide data feedback and affect paint application processes. Such a device is described in U.S. Pat. No. 6,073,055, and U.S. Ser. No. 08/966,960 which are hereby incorporated by reference.

Figure 1A:
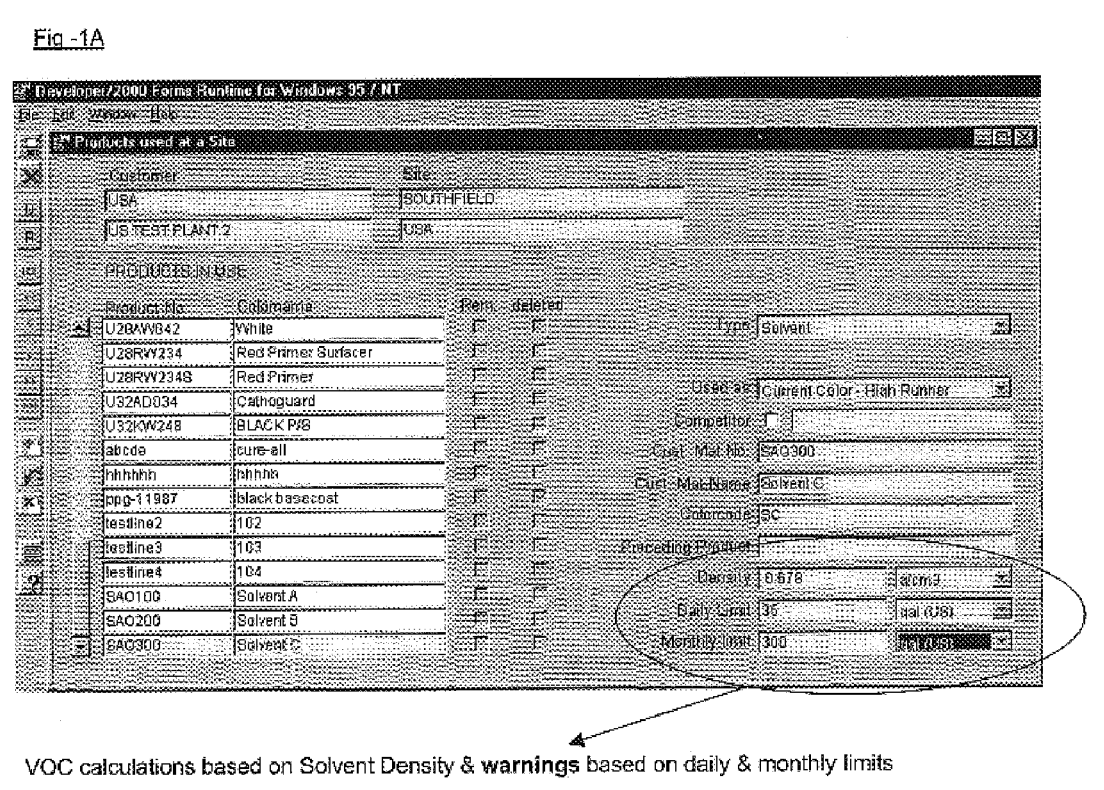

FIG. 1 illustrates a preferred embodiment of the present invention and shows a paint process control data structure 80. The data structure 80 collects, compiles and computes data involved in paint application operations at a paint application facility and provides information output. A paint-application facility database 90 receives information input from paint material 96 that is delivered to a paint application facility for painting vehicles, and also receives data from a paint application facility 98. The facility database 90 receives data input from the paint material 96 that includes product registration information 102 and material parameters 104 obtained from the paint manufacuturer or the paint application facility, and material constants obtained by paint application facility testing. The facility database 90 receives data input from a paint application facility 98 that includes paint and solvent additions 106 and paint usage 108. Additional data input 110 from a paint application facility includes volatile organic content emission regulation information, indicating allowed emissions limits per given solvent, as well as overall allowed volatile organic content emissions limits and the specified time frame for the allowed emission limits. Said solvent regulation information is provided to the paint application facility by regulatory agencies such as the U.S. Environmental Protection Agency. The database is connected to a calculation means 114. Said calculation means 114 may comprise a simplex calculator or any other suitable calculator or calculation means. A calculation of total voc emissions, and total volatalized emissions of specifically identified solvents is made and compared to the regulatory allowed emissions limits per given time period by the calculation means 114. The calculation means 114 is attached to a computer display (not shown) for generating reports. The reports generated are a volatile organic content report 118 for reporting the volatile organic content of the paints used in a paint application facility and a volatile organic content emission limits report 120 for reporting all volatilized solvents used in the painting system, (i.e. solvents added for reducing paint, and those solvents added in circulation lines and processing). Additionally, the computer is utilized to generate an automatic warning response 122. The automatic warning response 122 is software generated and provided via means of a computer display pop-up warning notice 128, or communicated via various electronic media that are connected to the database and or calculator. Shown are the internet web enabled communications 124 and e-mail warnings 126. The warnings may be an alert that emissions limits are in danger of exceeding regulatory limits or an alarm that regulatory limits have been exceeded. The warning system 122 may also include an alarm (not shown) to the paint application facility or to a remote location. The database 90 may also be connected to a centralized paint information and application system 140 in the vehicle assembly plant. Such a system is described in U.S. Pat. No. 6,073,055, which is hereby incorporated by reference.

FIG. 1A shows a sample input to the material testing contstants component of the paint process control. The input shown includes product codes, colors to match the codes, solvent density constants, solvent type, daily solvent limits and monthly solvent limits for a particular solvent.

FIG. 1B shows a monthly report for VOC emissions 118 as generated by the database and calculation means of FIG. 1. The report shown shows solvent usage and paint usage, well as volatilized solvent for various colors in a given month. The report also shows information regarding various paint batches such as the % non-volatile of a given paint batch, the actual and theoretical non-volatile content of the paint batch and the beginning and ending paint levels, including the amount of solvent added to a batch of paint.

FIG. 1C shows a monthly report for solvent limits 120 as generated by the database and calculation means of FIG. 1. The report shows the type of solvent, the amount used in the month, the daily and monthly limits for each solvent and whether daily or monthly usage exceeded regulatory limits and triggered an alarm warning.

FIG. 2 depicts the process control data structure template 253 as contained the computer memory 250 of computer 260. These components including the materials data structure 296, paint application data structure 298 and computer 260 are part of the process control coordinator 262.

Materials data structure 296 captures and stores such material related data as material parameters including solvent content of the paint, viscosity and paint material constants including solvent density, voc, and percent non-volatile content. The paint application data structure 298 identifies emissions of specific volatilized solvents and overall volatilie organic content emissions and regulatory limits for total volatile organic content emissions and for specifically identified volatilized solvents. The process control data structure template 253 interelates paint-related data with the computer memory 250 of a computer 260.

Figure 3:
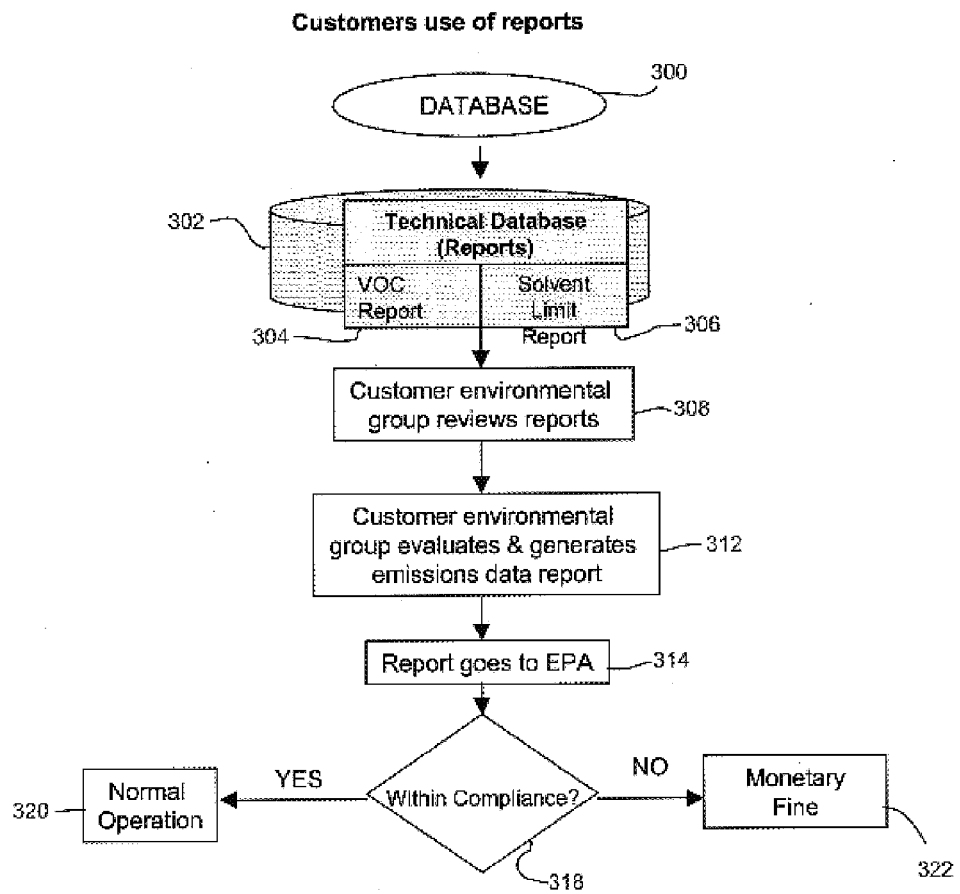
FIG. 3 depicts the steps whereby a paint application facility utilizes reports generated by the database.

FIG. 3 depicts the steps wherein the paint application facility uses information generated from the database and calculation means of the present invention. At the process block 302, a user, such as a vehicle assembly plant obtains certain technical information regarding the paint spraying system, such as a volatile organic content report for paint 304 or a solvent usage/emissions report 306. The requested information data sheet is retrieved from the central data base 300 and is sent to the customer at process block 308. At process block 312, customer reviews the data sheet information. The data is then sent to the Environmental Protection Agency (EPA) at process block 314. If decision block 318 determines that all volatile organic content emissions data are in the specified range, then the product is determined to be "compliant" at box 320. However, if decision block 318 determines that the specified ranges have been violated, a fine is assessed by the EPA at process block 322.

Figure 4:
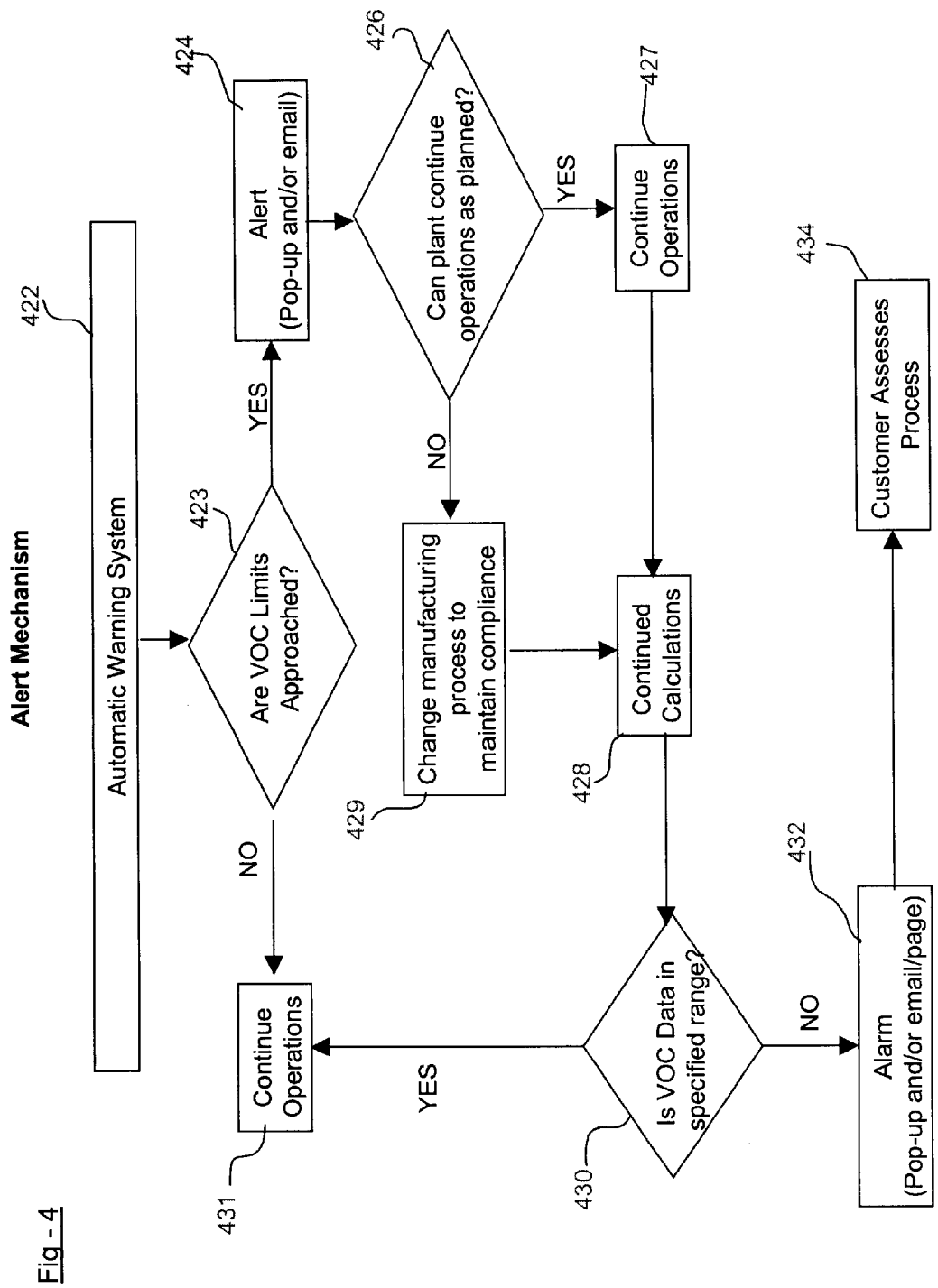
FIG. 4 illustrates a flow process diagram wherein the computer implemented apparatus utilizes data to trigger an emissions warning alert or alarm.

FIG. 4 illustrates the steps wherein the paint application facility uses the information from the various components of the present invention in order to trigger the emissions warning system. An automatic warning system 422 is triggered when calculations determine that emissions from a vehicle assembly plant will exceed specified limits within a given time frame. The automatic warning system 422 sends data to a decision module 423 whereby alternatively, a computer screen display pop-up warning alert 424 is triggered or operations are continued as determined by preset limits. Next a decision module 426 determines alternatively to continue to run as shown in operation box 427 or to change the manufacturing process at 429. For instance a particular composition of solvent may be discontinued, paint color changed, or vehicle production decreased or stopped, etc. Continuous calculations are made by a calculation means 428. A decision module 430 determines if volatile organic content emissions are within specified ranges. If these ranges are acceptable, production continues as designated at 431. If the ranges are unacceptable an alarm 432 is activated and conveyed via computer display pop-up warning, web enabled pager or cell phone, e-mail or other internet communication or electronic means. The customer assesses the information 434 and makes the decision to stop or continue production.

Figure 4A:
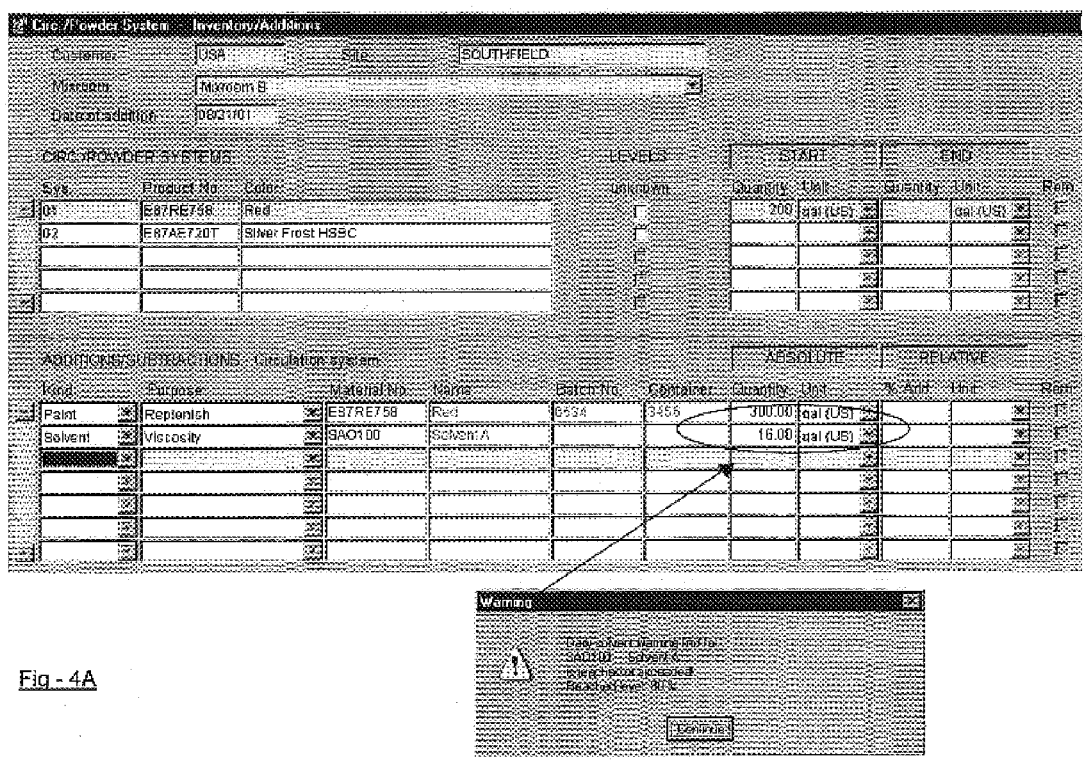
FIG. 4A is an enlarged view of the popup alert screen generated by the computer implemented apparatus.

FIG. 4A is an enlarged view of the warning alert popup screen 424. This data screen shows that an alert is generated because solvent usage is approaching the allowed regulatory limit. The alert is displayed on a computer display screen, showing the color, the solvent or solvents that are exceeding the daily limit and the level of solvent usage reached, based on total allowed regulatory limit of the solvent.

Figure 4B:
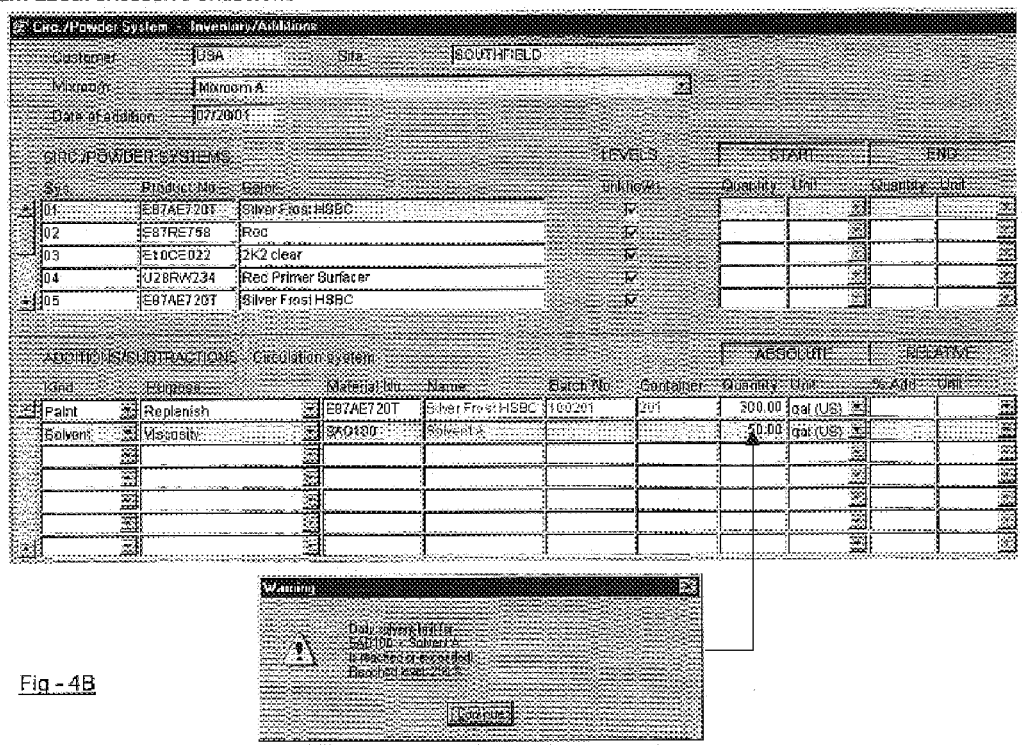
FIG. 4B is an enlarged view of the popup alarm screen generated by the computer implemented apparatus.

FIG. 4B is an enlarged view of the warning alarm popup screen 432. The alarm screen shows that an alarm has been generated because solvent usage has exceeded the daily regulatory limit. The % of solvent over daily regulatory limits is shown together with the paints usage.

Various other advantages of the present invention will become apparent to those skilled in the art after having the benefit of studying the foregoing text and drawings taken in conjunction with the following claims.

What is claimed is:

1. A computer-implemented apparatus for coordinating paint-related process steps of at least one paint-application facility, said paint-related process steps comprising at least one of data collecting, calculating, evaluating and reporting at least one of volatile organic content of paint, actual paint usage, projected paint usage, projected solvent usage from a painting process, solvent emission data, and volatile organic emission data, said apparatus comprising:

a process control data structure for collecting paint process control data selected from the group consisting of paint related characteristics, solvent additions, projected paint usage, emissions regulation data and combinations thereof, and for calculating total projected volatile organic emissions, total projected volatilized emissions of specific solvents and comparing said emissions to regulatory limits for said emissions, a paint application facility database for collecting and storing paint characteristic data, solvent additions, paint usage data and emission regulation data;

a calculation means attached to said database (a) for calculating total projected volatile organic emissions, total projected volatized emissions of specific solvents and for comparing said emissions to regulatory allowed emission limits;

at least one data display connected to said database and calculation means for receiving and displaying reports based on calculations provided by said calculation means; and a warning device activated by computer software and connected to said database and calculation means, for displaying a warning response generated by computer software communicated from electronic media connected to at least one of said database or data display.

2. The apparatus of claim 1 wherein said database further collects and stores paint material data and vehicle assembly plant data.

3. The apparatus of claim 1 wherein said data display provides volatile organic emissions reports and combinations thereof.

4. The apparatus of claim 1 wherein said data display provides a computer software activated data display warning message related to at least one of volatile organic emissions and regulatory limits for said emissions.

5. The apparatus of claim 1 wherein said warning device is an electronic means selected from the group consisting of web-based communication systems, electronic mail, web enabled pager devices, web enabled cellular telephonic devices, non-web enabled telephonic devices, and non-web enabled pager devices and combinations thereof.

6. The apparatus of claim 1 wherein the acquired paint characteristic data includes paint material constants and paint parameters.

7. The apparatus of claim 1 wherein the calculation means comprises a simplex calculator for constraining the permissible range of emissions from at least one painting facility within allowable regulatory ranges.

8. The apparatus of claim 1 further comprising:

a plurality of data displays for remotely receiving and displaying reports based on calculations provided by calculation means.

9. The apparatus of claim 8 further comprising:

a security database for providing security authorizations with respect to said plurality of data displays for remotely receiving and displaying said reports.

10. The apparatus of claim 1 further comprising means for connection to a centralized paint information and application system.

11. A method of determining volatile organic content emissions in a paint application facility and consequently performing a warning operation based on a determination of volatile organic content emissions, comprising (a) providing the paint application facility with a computer-implemented apparatus according to claim 1;

(b) communicating and storing to a paint application facility database and to a calculation means, data selected from the group consisting of paint material data, paint application data, paint related characteristics, amount of solvent additions, solvent emission data, projected paint usage and emissions regulation data and combinations thereof, (c) calculating the data received from the database with the calculation means;

(d) displaying the data via a computer based data display;

(e) coordinating the paint material data, the paint application data, the solvent emission data and the emissions regulations data;

(f) activating a warning via computer software, connected to said database and calculation means, where said warning is activated when coordinated volatile organic emission data and volatile organic emission regulatory limit data indicate regulatory solvent limits are or will be exceeded.

12. The method of claim 11 wherein said data is acquired from paint characteristic data and paint application facility data.

13. The method of claim 11 wherein a solvent limits report or volatile organic emissions report is displayed via a computer data display.

14. The method of claim 11 wherein a warning message activated by data from volatile organic emissions data and volatile organic emissions regulation data for said emissions is displayed via said computer data display.

15. The method of claim 11 wherein said warning is displayed via electronic means other than a computer data display.

16. The method of claim 15 wherein said warning is displayed via an electronic device selected from the group consisting of web-based communication systems, electronic mail, web enabled pager devices, web enabled cellular telephonic devices, non-web enabled telephonic devices, non-web enabled pager devices and combinations thereof.

17. The method of claim 11 wherein said step of communicating and storing the paint characteristic data includes data selected from the group consisting of paint constants, paint parameters and paint application data.

18. The method of claim 11 wherein the calculation step is performed by a simplex calculator.

19. The method of claim 18 wherein the simplex calculator constrains the permissible range of emissions from a painting facility within allowable regulatory ranges.

* * * * *